United States Patent

[11] 3,609,729

| [72] | Inventor | Wilmer C. Anderson<br>Greenwich, Conn. |
|---|---|---|
| [21] | Appl. No. | 789,209 |
| [22] | Filed | Jan. 6, 1969 |
| [45] | Patented | Sept. 28, 1971 |
| [73] | Assignee | General Time Corporation<br>Stamford, Conn. |

[54] TELEMETRY SYSTEM
17 Claims, 4 Drawing Figs.

| [52] | U.S. Cl. | 340/206,<br>340/203, 340/347 AD, 325/143, 235/92 CM |
|---|---|---|
| [51] | Int. Cl. | G08c 19/16 |
| [50] | Field of Search | 340/203,<br>206, 347; 235/92 |

[56] References Cited
UNITED STATES PATENTS

| 3,007,149 | 10/1961 | Brown | 340/347 |
|---|---|---|---|
| 3,062,443 | 12/1962 | Palmer | 235/92 |
| 3,349,391 | 10/1967 | Kimura | 340/347 |
| 3,444,510 | 5/1969 | Tyndale et al. | 340/206 |

Primary Examiner—John W. Caldwell
Assistant Examiner—Robert J. Mooney
Attorney—Pennie, Edmonds, Morton, Taylor & Adams ABSTRACT: A telemetry system including a transmitter wherein a numerical count proportional to a parameter is momentarily stored in a series arrangement of multistage counters and wherein additional pulses are applied to the multistage counters in succession to develop a plurality of time positioned pulses suitable for transmission. The system also includes a receiver for displaying the transmitted data.

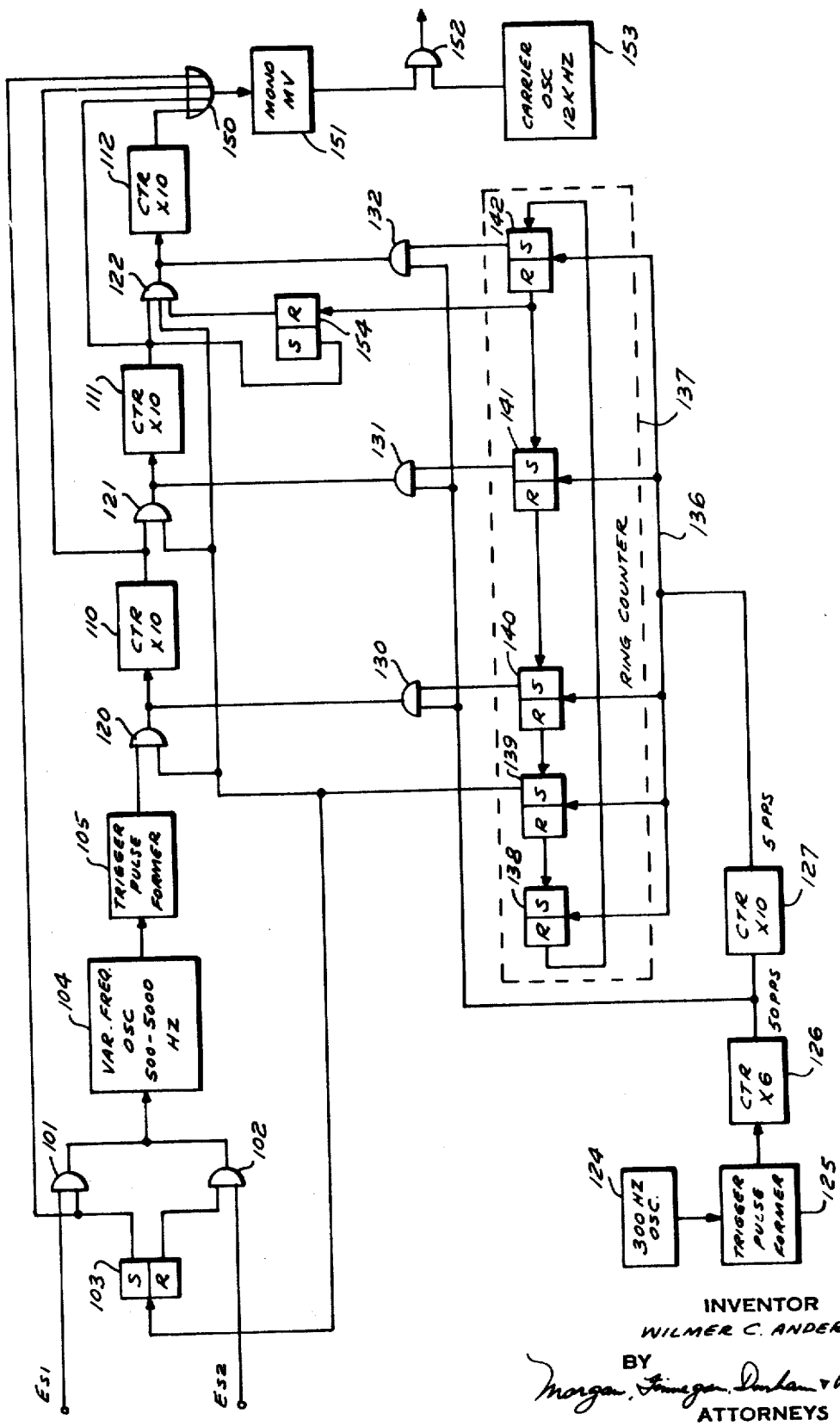

TELEMETRY SYSTEM

This invention relates to telemetry systems and, while not limited thereto, it relates particularly to telemetry systems useful for under water oceanographic telemetry.

Although sonic carrier frequencies are customarily used in underwater telemetry transmissions, considerable problems exist because of the high noise level which overlaps the available sonic transmission band. Also, transmitted sonic signals become badly diffused and distorted during transmission because of refraction and reflections of the signal. Accurate and reliable telemetry transmission under these circumstances is, accordingly, extremely difficult.

Among the objects of the invention is to provide a reliable and accurate telemetry system having general application, but in particular, being capable of providing reliable and accurate oceanographic telemetry transmissions.

The parameters being sensed or measured in a telemetry system are normally in the form of analog-type signals which vary in amplitude according to the value of the parameter being measured. These analog signals, as such, cannot be transmitted accurately or reliably, particularly from an underwater installation. In accordance with the invention the signal is first converted into a digital form by means of a variable frequency pulse generator which provides pulses at a repetition rate proportional to the magnitude of the analog signal. This pulse train is applied to a series arrangement of multistage counters during a predetermined time interval and, thus, a count is stored proportional to the magnitude of the analog signal.

Next, a train of pulses having a fixed repetition rate is applied to the individual multistage counter circuits in succession causing each counter in turn to reach a full count. When this occurs, a burst of energy is transmitted, preferably, in the form of a short sonic pulse at a convenient sonic carrier frequency. Accordingly, the transmitted pulses are positioned in time according to the complement of the number stored in the individual multistage counters. If, for example, the system includes four decade (multistage) counters, four successive time positioned pulses would be transmitted, each such pulse corresponding to the instant when the respective decade counter reaches a full count. In the case of a decade counter, the transmitted time positioned pulse can occupy one of 10 discrete time slots.

When the sonic pulses arrive at the receiver, they are badly distorted and diffused as well as being mixed with considerable noise. The signal at the receiver passes through various detector and pulse shaping circuits which extract the essential information from the received signal. Preferably, the receiver includes a local oscillator synchronized to the fixed repetition rate oscillator in the transmitter, this being achieved by means of synchronizing pulses transmitted along with the time positioned data pulses. Since the transmitted signals can properly occur only in certain discrete time slots, a time coincidence comparison can be made between the received signal pulses and the local oscillator signal pulses to thereby reject stray pulses such as may be generated by the noise.

The manner in which the foregoing and other objects are achieved according to the invention is more fully described in the following specification which sets forth several illustrative embodiments of the invention. The drawings form part of the specification wherein:

FIG. 4 is a schematic block diagram showing a transmitter unit in accordance with another embodiment of the invention.

Figure 1:
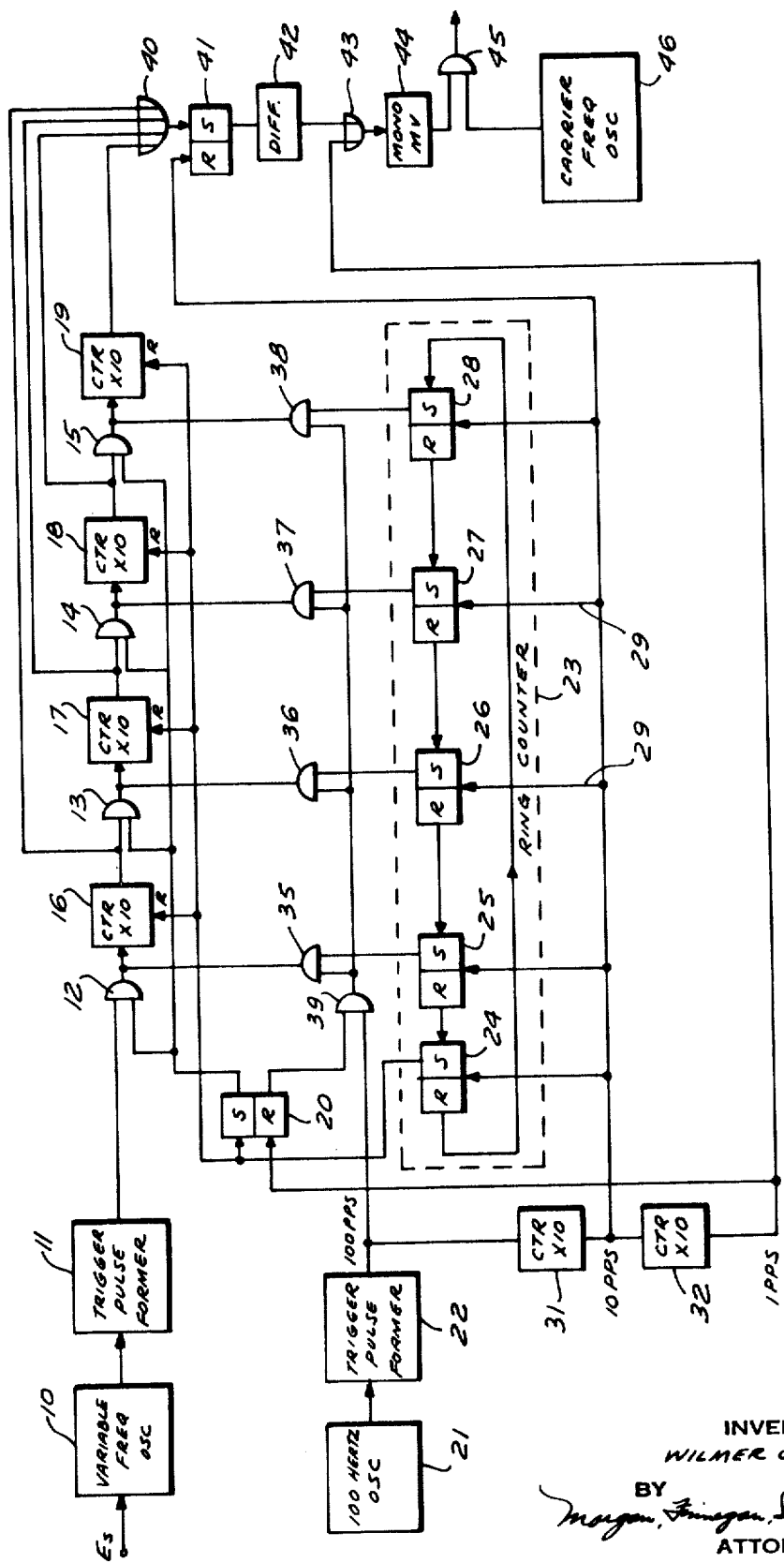
FIG. 1 is a schematic block diagram illustrating a transmitter according to one embodiment of the invention.

A transmitter unit, according to the invention is illustrated in block diagram form in FIG. 1. The parameter being sensed or measured appears as an electrical signal $E_s$ having an amplitude proportional to the parameter. This signal is applied to a variable frequency oscillator 10 which produces an output signal having a frequency proportional to the magnitude of the applied voltage. This oscillator, for example, may have a frequency range from 500 cycles to 10 kilocycles. The output of the oscillator is coupled to a trigger pulse former 11 which responds, for example, to a change in polarity from negative to positive and produces a square output pulse in response thereto.

The pulse train emerging from pulse former 11 is applied to a serial arrangement of four decade counters 16–19 during a predetermined time interval as determined by the state of a flip-flop circuit 20. As a result, a count is stored in the counters 16–19 which is proportional to the frequency or pulse repetition rate of the pulse train originating from variable oscillator 10 which in turn is proportional to the amplitude of the applied input signal $E_s$.

More specifically, the output of pulse former 11 is coupled to the input of a decade counter 16 via an AND circuit 12, the output of counter 16 is similarly coupled to the input of a decade counter 17 via an AND circuit 13, the output of counter 17 is coupled to the input of a decade counter 18 via an AND circuit 14, and the output of decade counter 18 is coupled to the input of decade counter 19 via an AND circuit 15. The other input for each of the AND circuits 12–15 is derived from the "set" output of flip-flop circuit 20.

When flip-flop circuit 20 is in the "set" state, its output is energized and therefore each of the AND circuits 12–15 is conditioned. This, in effect, completes the interconnection between the successive decade counters 16–19, and also completes the connection from decade counter 16 back to pulse former 11 via AND circuit 12. Thus, when flip-flop circuit 20 is in the "set" state, the pulses flow from pulse former 11 into the decade counters.

A fixed frequency oscillator 21 provides a 100-hertz signal which is applied to a trigger pulse former 22 to provide a pulse train having a 100 pulse per second repetition rate. This pulse train is applied to the decade counters 16–19 causing these counters to, in succession, reach a full count. In other words, 10 pulses are first applied to decade counter 19, 10 pulses are then applied to decade counter 18 and thereafter 10 pulses are applied to each of decade counters 17 and 16 in that order. The pulse train developed by pulse former circuit 22 is also utilized to advance a ring counter 23 and this ring counter, in turn, controls the routing of pulses from the pulse former circuit to the decade counters 16–19.

More specifically, the output of pulse former circuit 22 is coupled to a decade counter 31 which, in turn, is coupled to a decade counter 32. Thus, a train of pulses appears at the output of counter 31 having a repetition rate of 10 pps and a train of pulses emerge from decade counter 32 having a repetition rate of 1 pps.

The output of counter 31 is coupled to the "shift" inputs of each of the individual binary stages 24–28 of the ring counter 23 via conductors 29. The individual stages are interconnected so that only one stage can be in the "set" state at any one time. Each time a pulse is applied to the "shift" inputs of the stages, the "set" state will shift one stage to the left. Thus, if stage 28 is initially in the "set" state, a shift pulse would cause stage 28 to return to the "reset" state and stage 27 to shift to the "set" state. Successive "shift" pulses would cause the "set" state to shift to stage 26, then to stage 25, then stage 26, then to stage 25, then stage 24, and then back to stage 28.

The "set" outputs of the binary stages 25–28 in the ring counter are connected, respectively, to one of the inputs of AND circuits 35–38, the outputs of these AND circuits being connected, respectively, to the inputs of counters 16–19. Pulse former 22 is coupled to the other input of AND circuits 35–38 via an AND circuit 39. A second input for AND circuit 39 is derived from the reset output of flip-flop circuit 20. The "set" output of binary stage 24 is coupled to the "set" input of flip-flop circuit 20 and the "reset" inputs of counter stages 16–19. The output of counter 32 is connected to the "reset" input of flip-flop circuit 20.

Flip-flop circuit 20 determines whether the pulses from variable frequency oscillator 10 are applied to the decade counter stages 16–19 via AND circuit 12, or whether the pulses originating from fixed frequency oscillator 21 are applied to the decade counters via AND circuit 39 and AND circuits 35–38. Thus, assume that flip-flop circuit 20 is initially in the "set" state. Under these circumstances AND circuit 12 is conditioned and the pulses originating from variable frequency oscillator 10 pass into the decade counter stages 16–19 to store a numerical count in the counter. Flip-flop circuit 20 is in the "set" state for exactly 500 milliseconds at which time a pulse emerges from counter 32 to shift flip-flop circuit 20 to the "reset" state. Note that flip-flop circuit 20 thereafter remains in the "reset" state for 500 milliseconds while ring counter 25 shifts five times to produce a "set" pulse from binary circuit 24, and that flip-flop circuit then remains in the "set" state for another 500 milliseconds before a "reset" pulse emerges from decade counter 32.

Upon the next occurrence of a pulse at the output of counter 31, the ring counter shifts so that stage 28 is in the "set" state thereby conditioning AND circuit 38. Ten pulses from pulse former circuit 22 are permitted to pass via AND circuits 39 and 38 into decade counter 19. These pulses cause decade counter 19 to reach a full count at some point in time depending upon the numerical count then stored in the counter. After 10 pulses have been applied to counter 19, another pulse will be applied to the ring counter via conductor 29, thereby placing stage 27 in the "set" state. As a result AND circuit 37 is conditioned and, therefore, 10 pulses are similarly applied to decade counter 18 which will reach a full count at a time dependent upon the numerical count stored therein. In similar fashion stage 26 of the ring counter is placed in the "set" state to condition AND circuit 36 so that 10 pulses are applied to decade counter 17, and thereafter the ring counter shifts so that stage 25 is in the "set" state to condition AND circuit 35 and permit 10 pulses to be applied to decade counter 16.

Subsequently, stage 24 is placed in the "set" state which in turn resets decade counters 16–19 and returns flip-flop circuit 20 to the "set" state. When flip-flop circuit 20 is again in the "set" state, the pulse train from pulse former 11 is again applied to decade counters 16–19 for a predetermined time interval. The sequence continues in this manner thereby repetitively sampling the analog signal applied at terminal $E_s$.

The output of decade counters 16–19 are connected to four separate inputs of an OR circuit 40 which, in turn, is connected to the "set" input of a flip-flop circuit 41. The output of counter 31 is connected to the "reset" input of flip-flop circuit 41. The "set" output of the flip-flop circuit is coupled to one input of an OR circuit 43 via a differentiator circuit 42, and the other input of the OR circuit derives its signal from the output of counter 32. The output of OR circuit 43 is coupled to one input of an AND circuit 45 via a monostable multivibrator circuit 44, and the other input of the AND circuit is derived from a carrier frequency oscillator 46. Oscillator 46 can be of any suitable type depending on use of the system. For oceanographic telemetry an oscillator capable of generating 12 kilohertz sonic signals could be used.

Whenever one of the counters 16–19 reaches a full count, the output stage of the decade counter changes state and this change of state passes through OR circuit 40 to place flip-flop circuit 41 in the "set" state. Differentiator circuit 42 responds to this change of state in flip-flop circuit 41 and produces a pulse which is shaped by monostable multivibrator circuit 44 to condition AND gate 45 for a predetermined time interval. During this interval a short burst of energy from oscillator 46 passes through the AND gate and is transmitted to the receiver.

Flip-flop circuit 41 is reset after each group of 10 pulses from pulse former circuit 22, and, therefore, each of the decade counters 16–19 in turn cause transmission of a pulse via AND circuit 45 at the point in time when the respective counter reaches a full count. Accordingly, the transmitted pulses are time positioned according to the numerical count stored in the respective one of decade counters 16–19.

The output of counter 32 is coupled to monostable multivibrator 44 via OR circuit 43. This connection serves to provide a reference pulse once for each operating cycle. As will be explained later, this reference pulse is utilized to synchronize the receiver unit to the transmitter unit.

Figure 3:
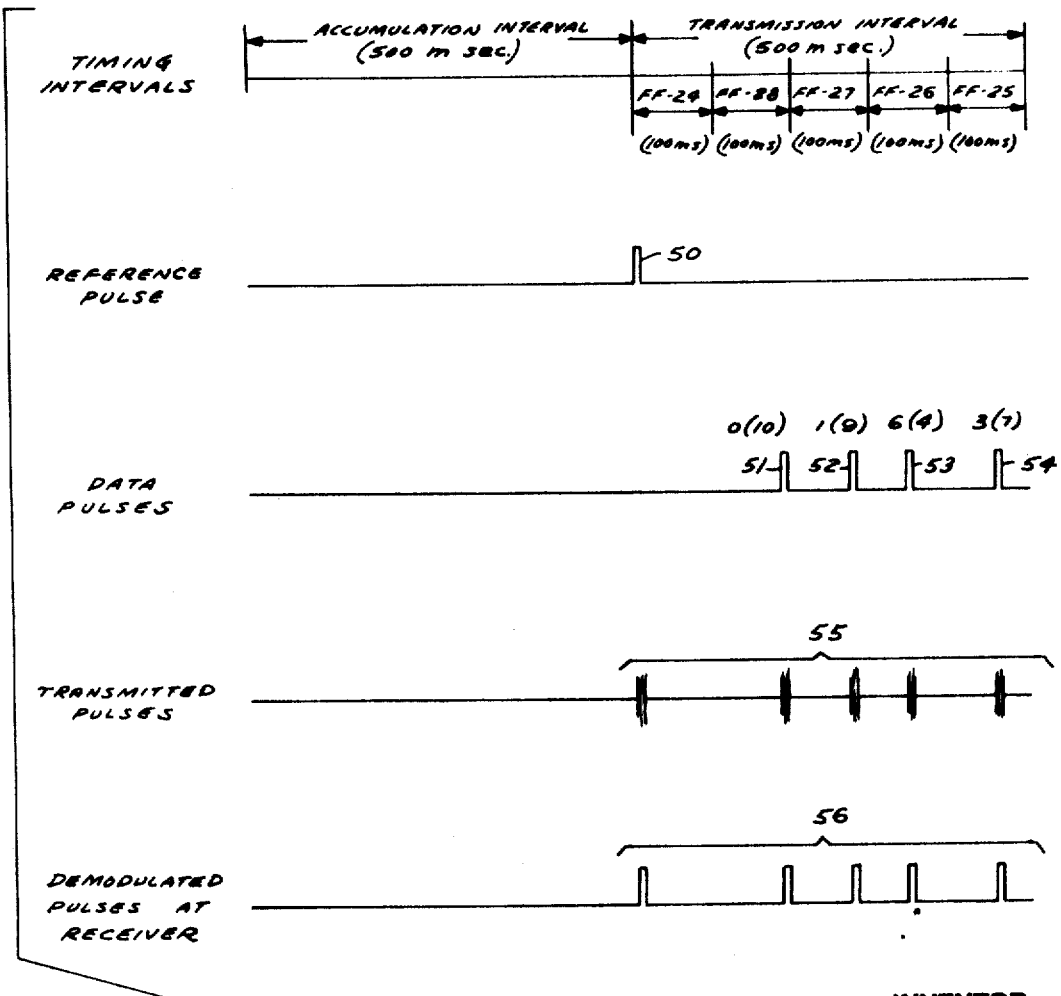
FIG. 3, is a set of pulse diagrams illustrating the signals appearing in a system including the transmitter and receiver units shown in FIGS. 1 and 2 respectively.

FIG. 3 illustrates the various timing intervals and the relative positions of pulses during a single cycle of operation of the transmitter unit. Each operating cycle includes an accumulation interval of 500 milliseconds. During this accumulation interval flip-flop circuit 20 is in the "set" state so that pulses from variable frequency oscillator 10 pass into the counter. Accordingly, a numerical count is stored in the decade counters 16–19. For illustration, assume that the numerical count stored during the accumulation interval is "0163."

The accumulation interval is terminated when a pulse emerges from counter 32. This pulse is applied to the "reset" input of flip-flop circuit 20 and, therefore, changes the state of the flip-flop circuit to terminate the accumulation interval and to begin the transmission interval which is likewise of a 500 millisecond duration. The pulse from counter 32 also passes via OR circuit 43 to provide a reference pulse 50.

At the beginning of the transmission interval, stage 24 (FF–24) is in the "set" state for 100 milliseconds. When the next pulse emerges from counter 31, this pulse is applied to the shift input of ring counter 23 and causes stage 28 (FF–28) to go into the "set" state for 100 milliseconds. During this time interval 10 pulses are permitted to pass via AND circuits 39 and 38 into decade counter 19. The numerical count stored in decade counter 19, according to the example mentioned above is zero and, therefore, decade counter 19 will reach a full count upon application of the 10 pulse. Upon reaching a full count, a pulse 51 is produced which, as can be seen from FIG. 3, occurs substantially at the end of the 100 millisecond interval.

When the next pulse emerges from counter 31, stage 27 of the ring counter assumes the "set" state for 100 milliseconds to permit 10 pulses to be applied to decade counter 18. The numerical count in this decade counter is "1," and, therefore, after the application of nine pulses, counter 18 will reach a full count and produce an output pulse 52. Thereafter, stage 26 of the ring counter is placed in the "set" state and 10 pulses are applied to decade counter 17. The count in this stage is "6," and, therefore, an output pulse 53 appears after application of four pulses. Finally, stage 25 of the ring counter is placed in the "set" state, and since a count of "3" has been stored in decade counter 16, and output pulse 54 is provided after the application of seven pulses.

Both the reference pulses which are applied to OR circuit 43 and the data pulses which are applied to OR circuit 40, operate AND circuit 45 such that a carrier frequency pulse train 55 is transmitted as shown in FIG. 3. These pulses are demodulated to produce a corresponding pulse train 56 at the receiver unit. This pulse train includes a reference pulse followed by four time positioned data pulses each indicating the stored count in a different one of the decade counters of the transmitter.

Figure 2:
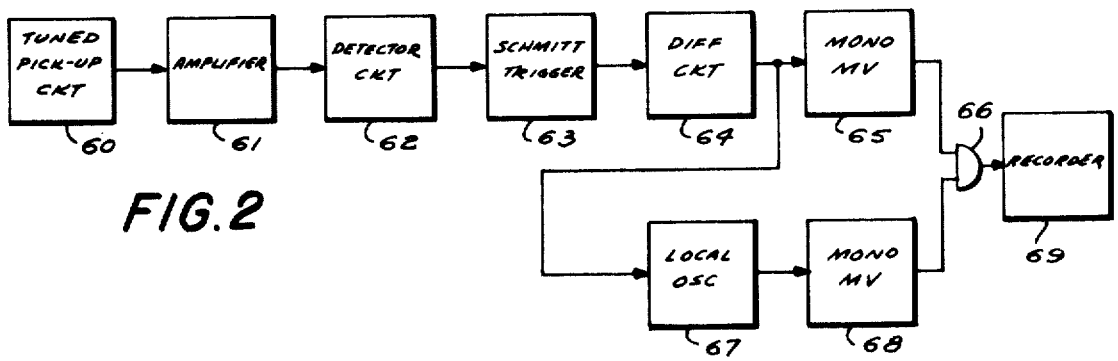
FIG. 2 is a schematic block diagram illustrating a receiver unit compatible with the transmitter unit shown in Fig. 1.

The receiver unit is shown in FIG. 2 in block diagram form. The receiver includes a sonic pickup unit which is incorporated in a tuned pickup circuit 60 tuned to the frequency of the carrier generated by carrier frequency oscillator 46 in the transmitter unit. The received signal includes the carrier frequency pulses which have been distorted during transmission, and also includes extraneous noise signals.

The output from the tuned pickup circuit is amplified in an amplifier 61 and thereafter demodulated in a detector circuit 62 which includes a rectifier and integration network. The detected pulse signal is squared up in a Schmidt trigger circuit 63, and then passes through a differentiator circuit 64 which responds to the leading edge of the pulse from the S Schmidt trigger. The signal is then passed to one input of an AND circuit 66 via a monostable multivibrator circuit 65 having approximately a 4 millisecond pulse width so that the pulses which emerge therefrom have approximately the same width as those generated by monostable multivibrator circuit 44 in the transmitter unit.

The output of differentiator circuit 64 is also supplied to a local oscillator 67 which is in the form of a free-running oscillator circuit arranged to operate in synchronism with periodically applied input pulses. In other words, during the intervals between successive pulses from the differentiator circuit, oscillator 67 operates in a free-running fashion but the oscillator is synchronized with the applied pulses when they appear. The output of oscillator 67 is applied to the other input of AND circuit 66 via a monostable multivibrator circuit 68. Accordingly, when there is coincidence between pulses from monostable multivibrators 65 and 68, this coincidence is detected and a pulse passes through to the recorder 69 where the pulse is recorded.

Preferably, the recorder turns at a speed controlled by the frequency of oscillator 67 to thereby maintain exact synchronism between the recorder and the incoming signal. The trace produced by the recorder will correspond, approximately to that shown in the last line of FIG. 3 and hence would include a reference pulse followed by four time positioned data pulses. On examining the relative spacing and noting in which one of the discrete time slots the data pulses appear, the original information can be reconstructed.

Another embodiment of the invention is shown in Fig. 4 wherein a transmitter unit is shown capable of handling analog input signals from two different sources $E_{s1}$ and $E_{s2}$. This embodiment also includes various other simplifications and desirable features which will be described in more detail later.

The analog input signal $E_{s1}$ is applied to one input of an AND circuit 101, and the other analog input signal $E_{s2}$ is applied to an input of an AND circuit 102. The other inputs of the AND circuits 101 and 102 are connected to the "set" and "reset" outputs, respectively, of a flip-flop circuit 103. The flip-flop circuit determines which one of the incoming signals will be applied to variable frequency oscillator 104. The variable frequency oscillator provides output signals ranging between 500 and 5,000 Hertz, the output frequency being proportional to the magnitude of the applied input signal. The output of variable frequency oscillator 104 is passed through a trigger pulse former 105 to provide a corresponding pulse train.

Decade counters 110, 111 and 112 are serially interconnected via AND circuits 120, 121, and 122, when the AND circuits are conditioned. These AND circuits are conditioned for a selected period of time during which the pulses provided from the variable frequency oscillator are counted to store a corresponding numerical count in the decade counters.

A fixed frequency oscillator 124 is of a readily available tuning fork oscillator type and provides a 300 hertz signal which is passed through a trigger pulse former 125 to provide a corresponding pulse train. This pulse train is passed through a counting chain 126, 127 which divides by 6 and then divides by 10. Accordingly, a 50 pulse per second pulse train appears at the output of counter 126 and a 5 pulse per second pulse train appears at the output of counter 127.

The basic timing circuit for the transmitter unit in Fig. 4 is the ring counter 137 which includes five separate stages interconnected so that each time a pulse is applied via the conductor 136, the "set" state moves one stage to the left. The "set" output of stages 140–142 are connected to respective inputs of AND circuits 130–132, the outputs of these AND circuits being connected to the inputs of decade counters 110–112 respectively. The output of counter 126 is applied to the other input of AND circuits 130–132. Accordingly, when stage 142 of the ring counter is in the "set" state, AND circuit 132 is conditioned and pulses from counter 126 are passed through the AND circuit into counter 112. Similarly, when stage 141 is in the "set" state pulses are applied to counter 111, and when stage 140 is in the "set" state the pulses are applied to counter 110. Counter 127 supplies the shift pulses to conductor 136 of the ring counter and, since it divides by 10, exactly 10 pulses are permitted to pass through the AND circuits 130–132 respectively between each successive shift of the ring counter.

The "set" output of stage 139 of the ring counter is connected to the input of AND circuits 120–122 which conditions these AND circuits and permits the pulse train originating from the variable frequency oscillator 104 to pass into the decade counters 110–112. The "set" output of stage 139 is also connected to the binary input of flip-flop 103 such that flip-flop 103 will change state each time a pulse is applied, i.e. each time stage 139 of the ring counter changes from the "set" to the "reset" state. The "set" output of flip-flop circuit 103 is connected to one input of a four input OR circuit 150, and the outputs of decade counters 110–112 are connected to the three other inputs. The output of the OR circuit is coupled to one input of an AND circuit 152 via a monostable multivibrator circuit 151, the latter functioning as a pulse shaper. The other input of AND circuit 152 is derived from a carrier frequency oscillator 153 which operates at a frequency of 12 kilo Hertz. Accordingly, each time a pulse is developed by the monostable multivibrator 151 a short burst of energy is transmitted.

It is impractical to construct a variable frequency oscillator which will produce frequencies in the close to zero frequency range. Accordingly, variable frequency oscillator 104 is designed so that a zero input DC signal will provide a 500 Hertz output signal and the frequency will thereafter increase linearly according to further increased in the applied signal. Flip-flop circuit 154 is included in the transmitter between decade counters 111 and 112 to compensate for the frequency shift. Since the pulses are permitted to pass into the decade counters 110–112 during a 200 millisecond time interval (the period during which stage 139 is in the "set" state) a zero input signal causes oscillator 104 to operate at 500 Hertz and therefore 100 pulses pass into decade counters 110–112. Accordingly, if the first 100 counts are eliminated, the count which is stored in the decade counters 110–112 will have an absolute relationship relative to the applied analog input signal.

The output of counter 111 is connected to the "set" input of a flip-flop circuit 154, and the "reset" output of stage 142 of the ring counter is connected to the "reset" input of the flip-flop circuit. The "reset" output of flip-flop circuit 154 is connected to the remaining input of three input AND gate 122 which controls transference of pulses between decade counters 111 and 112. Assume initially that flip-flop circuit 154 is in the "set" state and, therefore, AND circuit 122 is not conditioned. As a result, when pulses are applied from the variable frequency oscillator to the decade counter stages, the first 100 pulses will cause a full count to appear on decade counters 110 and 111. However, a pulse is not then transferred into counter 112 because flip-flop circuit 154 is the "set" state. However, the pulse which emerges from decade counter 111 changes the state of the flip-flop circuit so that only the succeeding pulses are transferred into decade counter 112. The net result is that the first 100 counts are discarded. Note that the system can easily be calibrated by adjusting the zero voltage frequency of variable frequency oscillator 104 until it corresponds to exactly 100 pulses for a 200 millisecond time interval.

The timing sequence for the unit shown in FIG. 4 is similar to that previously referred to in Fig. 3, except that a full cycle of operation includes two accumulation intervals and two transmission intervals. In other words, during the first 200 millisecond accumulation interval, as determined by the state of flip-flop circuit 103 and the conditioning of AND circuits 120–122, a numerical count is stored in the decade counters 110–112 as derived from the analog input source $E_{s1}$. The first accumulation interval is followed by a 200 millisecond pause while stage 138 of the ring counter is in the "set" state and a 600 millisecond transmission interval during which pulses are applied to the decade counters via AND circuits 130–132 to provide the time positioned data pulses. During the next accumulation interval, a count is stored in decade counters 110–112 which is derived from the other analog input source $E_a$ followed by a pause and another transmission interval. With the system shown in Fig. 4, a data pulse is produced when the respective decade counter reaches a full count and the transmitted pulses are therefore time positioned in discrete time slots. Instead of producing four data pulses (as shown in Fig. 3), the system in Fig. 4 only produces three data pulses which is found to be sufficient because of the increased efficiency of the transmitting unit as achieved by discarding the first 100 pulses by means of flip-flop circuit 154.

The receiver unit shown in Fig. 2 can be used to receive the pulses from the transmitter unit in Fig. 4. The receiver unit reproduces the reference and data pulses provided by the transmitter and compares the signals with a local oscillator so that only pulses appearing in the proper time slots are accepted. Ultimately, the data is recorded on a strip chart and, thereafter, analyzed.

It should be obvious to those skilled in the art that there are numerous variations within the scope of this invention. The invention is more particularly defined in the appended claims.

1. A transmitter for a telemetry system comprising
    a plurality of multistage counters interconnected in a series arrangement;
    variable frequency signal generating means for producing a first electrical pulse signal having a repetition rate proportional to the magnitude of a parameter applied thereto;
    gating means interconnected between said signal generating means and said counters to apply said first electrical pulse signal to said counters during a predetermined interval to store a pulse count therein;
    second signal generating means for providing a second electrical pulse signal having a fixed repetition rate;
    circuit means interconnecting said second signal generating means and said counters to apply said pulses having a fixed repetition rate to said multistage counters in succession causing each in turn to reach a full count; and
    means coupled to said counters and operative to transmit a signal each time one of said multistage counters reaches a full count.

2. A transmitter for a telemetry system according to claim 1 wherein said multistage counters are decade counters.

3. A transmitter for a telemetry system according to claim 1 wherein said circuit means comprises a ring counter and a plurality of AND circuits, said second signal generating means being connected to said ring counter to control the operation thereof, and said ring counter being connected to control the routing of signals from said second signal generating means to said multistage counters, in succession, via said AND circuits.

4. A transmitter for a telemetry system according to claim 1 further comprising binary circuit means for activating said gating means and said circuit means alternately to provide separate data accumulation and data transmission intervals.

5. A transmitter according to claim 1 wherein said means coupled to said multistage counters and operative to transmit a signal each time one of said multistage counters reaches a full count includes a carrier frequency oscillator 46 for producing sonic signals.

6. A transmitter for a telemetry system according to claim 1 wherein;
    said predetermined interval is a data accumulation interval;
    said circuit means interconnecting said second signal generating means and said counter applies said pulses during a data transmission interval; and further comprising:
    ring counter means connected to said second signal generating means and controlled thereby, said ring counter means being connected to control said first and second gate circuit means.

7. A transmitter for a telemetry system comprising:
    a variable frequency signal generating means for producing a first electrical pulse signal having a repetition rate proportional to the magnitude of an analog signal applied thereto;
    circuit means connected to said variable frequency signal generating means for alternately applying a selected one of a plurality of analog signals thereto;
    a plurality of multistage counters interconnected in a series arrangement;
    gating means interconnected between said signal generating means and said counters to apply said first electrical pulse signal to said counters during a predetermined interval to store a pulse count therein;
    second signal generating means for providing a second electrical pulse signal having a fixed repetition rate;
    circuit means interconnecting said second signal generating means and said counters to apply said pulses having a fixed repetition rate to said multistage counters in succession causing each in turn to reach a full count; and
    means coupled to said counters and operative to transmit a signal each time one of said multistage counters reaches a full count.

8. A transmitter for a telemetry system according to claim 7 wherein said multistage counters are decade counters.

9. A transmitter for a telemetry system according to claim 7 wherein said circuit means comprises a ring counter and a plurality of AND circuits, said second signal generating means being connected to said ring counter to control the operation thereof, and said ring counter being connected to control the routing of signals from said second signal generating means to said multistage counters, in succession, via said AND circuits.

10. A transmitter according to claim 7 wherein said means coupled to said multistage counters and operative to transmit a signal each time one of said multistage counters reaches a full count includes a carrier frequency oscillator for producing sonic signals.

11. A transmitter for a telemetry system comprising
    a variable frequency pulse generator having a frequency range not including zero for providing a first electrical pulse signal having a frequency proportional to the magnitude of an applied input signal;
    a plurality of multistage counters interconnected in a series fashion;
    gating means interconnected between said variable frequency oscillator and said counters to permit transference of said first electrical pulse signal into said counters during a predetermined data accumulation interval;
    circuit means connected to said plurality of multistage counters and operative to detect an initial count therein equal to that provided when said applied input signal has a predetermined magnitude and for discarding said initial count during said predetermined interval;
    a fixed frequency pulse generator
    circuit means interconnecting said fixed frequency pulse generator and said counters so that a predetermined number of pulses is applied to each of said multistage counters in succession during a transmission interval; and
    carrier signal generating means coupled to said counter and operative to transmit a signal each time one of said multistage counters reaches a full count.

12. A method of encoding an analog signal comprising the steps of
    converting said analog signal into a first pulse train having a repetition rate proportional to the magnitude of said analog signal;
    counting pulses in said first pulse train during a predetermined data accumulation interval to obtain a multidigit count; and
    generating a pulse position modulated pulse train including a data pulse for each digit of said multidigit count, each such pulse being time positioned according to the complement of the respective digit count.

13. The method according to claim 12 wherein said multidigit count is on a base 10.

14. The method according to claim 12 wherein said second pulse train is developed including a reference pulse preceding each group of data pulses.

15. The method according to claim 12 for encoding a plurality of analog signals wherein different ones of said analog signals are converted to form said first pulse train during successive ones of said accumulation intervals.

16. In a telemetry system, the combination of a transmitter comprising:
  means for converting an input signal into a first pulse train having a repetition rate proportional to said input signal;
  a plurality of decade counters connected to said converting means in a serial fashion to count pulses in said pulse train during a predetermined data accumulation interval;
  circuit means coupled to said decade counters to develop, during a transmission interval, a second pulse train including a reference pulse followed by a data pulse for each of said decade counters, said data pulses being time positioned in accordance with count in the respective one of said decade counters; and
  carrier frequency generating means coupled to said circuit means for transmitting a carrier frequency pulse for each of said pulses in said second pulse train; and
  a receiver comprising:
  a tuned circuit responsive to said carrier frequency pulses, and circuit means coupled to said tuned circuit for reproducing said second pulse train.

17. In a telemetry system, the combination of a transmitter comprising:
  a plurality of multistage counters interconnected in a series arrangement;
  variable frequency signal generating means for producing a first electrical pulse signal having a repetition rate proportional to the magnitude of a parameter applied thereto;
  gating means interconnected between said signal generating means and said counters to apply said first electrical pulse signal to said counters during a predetermined interval to store a pulse count therein;
  second signal generating means for providing a second electrical pulse signal having a fixed repetition rate;
  circuit means interconnecting said second signal generating means and said counters to apply said pulses having a fixed repetition rate to said multistage counters in succession causing each in turn to reach a full count; and
  means coupled to said counters and operative to transmit a first pulse train including a reference pulse followed by a time positioned data pulse occuring each time one of said multistage counters reaches a full count; and
  a receiver comprising:
  tuned circuit means for receiving signals from said transmitter and for reproducing said first pulse train,
  local pulse generating means coupled to said tuned circuit means for producing a second pulse train of regularly spaced pulses synchronized to the occurrence of pulses in said first pulse train;
  coincidence circuit means connected to said tuned circuit means and said local pulse generating means to pass only pulses which are coincident in said first and second pulse trains; and
  recorder means connected to said coincidence circuit means to record said coincident pulses.